(12) United States Patent
Folk et al.

(10) Patent No.: US 8,141,772 B1
(45) Date of Patent: Mar. 27, 2012

(54) SYSTEM AND METHOD OF RECONCILING CURRENCY AND COIN IN A CASH HANDLING DEVICE

(75) Inventors: Amy Baker Folk, Charlotte, NC (US); William Thomas Sanders, Denver, NC (US); Daniel Christopher Bohen, Charlotte, NC (US); Shane Anthony Johnson, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 500 days.

(21) Appl. No.: 12/277,890

(22) Filed: Nov. 25, 2008

Related U.S. Application Data

(63) Continuation-in-part of application No. 12/241,201, filed on Sep. 30, 2008.

(51) Int. Cl.
*G06Q 40/00* (2012.01)
*G06Q 20/00* (2012.01)
*G07D 11/00* (2006.01)
*G07F 19/00* (2006.01)
*G07F 7/04* (2006.01)
*G06K 7/00* (2006.01)
*G07G 1/00* (2006.01)

(52) U.S. Cl. ........... 235/379; 235/7 R; 235/22; 235/435; 705/16; 705/22; 705/23; 194/206

(58) Field of Classification Search .................. 235/7 R, 235/379, 22, 435; 705/16, 22, 23; 194/206
See application file for complete search history.

(56) References Cited

U.S. PATENT DOCUMENTS

| | | | | |
|---|---|---|---|---|
| 4,059,122 A | * | 11/1977 | Kinoshita | 453/3 |
| 4,522,275 A | * | 6/1985 | Anderson | 177/25.13 |
| 4,725,949 A | * | 2/1988 | Dreher | 705/24 |
| 4,988,849 A | * | 1/1991 | Sasaki et al. | 235/379 |
| 5,606,157 A | | 2/1997 | Awatsu et al. | |
| 5,692,067 A | | 11/1997 | Raterman et al. | |
| 5,695,038 A | * | 12/1997 | Keith et al. | 194/206 |
| 5,756,977 A | * | 5/1998 | Biss | 235/7 R |
| 5,777,304 A | | 7/1998 | Awatsu et al. | |
| 5,864,826 A | | 1/1999 | Awatsu et al. | |
| 5,899,804 A | * | 5/1999 | Chiba et al. | 453/11 |
| 5,900,607 A | | 5/1999 | Awatsu et al. | |
| 5,947,257 A | * | 9/1999 | Schwartz | 194/224 |
| 6,003,652 A | * | 12/1999 | Murata et al. | 194/206 |
| 6,028,951 A | | 2/2000 | Raterman et al. | |
| 6,073,744 A | | 6/2000 | Raterman et al. | |
| 6,523,742 B1 | | 2/2003 | Awatsu et al. | |
| 6,540,090 B1 | | 4/2003 | Sakai et al. | |
| 6,550,671 B1 | * | 4/2003 | Brown et al. | 235/379 |
| 6,622,911 B1 | * | 9/2003 | Holland-Letz et al. | 235/379 |
| 6,636,624 B2 | | 10/2003 | Raterman et al. | |
| 6,772,941 B1 | * | 8/2004 | Carter | 235/7 R |
| 6,896,177 B2 | * | 5/2005 | Carter | 235/7 R |

(Continued)

*Primary Examiner* — Daniel Walsh
(74) *Attorney, Agent, or Firm* — Banner & Witcoff, Ltd.; Michael A. Springs

(57) ABSTRACT

A cash recycler or other currency handling device includes a system and method for counting and/or reconciling cash, including currency and/or coin, in a cash drawer or till. The cash drawer may be inserted into a cash handling device and the amount of cash in the drawer may be determined, i.e., using scales to weigh the cash. In some arrangements, the cash may be removed from the cash drawer. In other arrangements, some or all of the cash (i.e., the coin or the currency) may remain in the cash drawer for use in a subsequent shift, workday, etc.

12 Claims, 16 Drawing Sheets

U.S. PATENT DOCUMENTS

| | | | |
|---|---|---|---|
| 6,934,688 B2* | 8/2005 | Carter | 235/382 |
| 6,983,836 B2 | 1/2006 | Adams et al. | |
| 7,036,651 B2 | 5/2006 | Tam et al. | |
| 7,059,513 B2* | 6/2006 | Daugs et al. | 235/10 |
| 7,112,130 B2 | 9/2006 | Nishimura et al. | |
| 7,143,933 B2* | 12/2006 | Uematsu et al. | 235/379 |
| 7,163,454 B2* | 1/2007 | Carter | 453/16 |
| 7,347,358 B2* | 3/2008 | Ireland et al. | 235/379 |
| 7,900,829 B1* | 3/2011 | Folk et al. | 235/380 |
| 7,950,512 B2* | 5/2011 | Folk et al. | 194/200 |
| 7,992,768 B2* | 8/2011 | Benigno et al. | 235/7 R |
| 8,011,581 B1* | 9/2011 | Folk et al. | 235/385 |
| 8,019,663 B1* | 9/2011 | Bohen et al. | 705/30 |
| 2001/0013541 A1* | 8/2001 | Modi | 235/379 |
| 2001/0032118 A1* | 10/2001 | Carter | 705/11 |
| 2001/0034203 A1* | 10/2001 | Geib et al. | 453/3 |
| 2002/0152141 A1* | 10/2002 | Carter | 705/29 |
| 2004/0173432 A1* | 9/2004 | Jones | 194/216 |
| 2004/0231955 A1* | 11/2004 | Carter | 194/217 |
| 2005/0017066 A1* | 1/2005 | Carter | 235/375 |
| 2005/0077142 A1* | 4/2005 | Tam et al. | 194/217 |
| 2005/0077347 A1* | 4/2005 | Uematsu et al. | 235/379 |
| 2005/0205654 A1* | 9/2005 | Carter | 235/7 R |
| 2005/0230471 A1* | 10/2005 | Carter | 235/379 |
| 2005/0283403 A1* | 12/2005 | Ramirez et al. | 705/16 |
| 2006/0151283 A1* | 7/2006 | Carter | 194/217 |
| 2006/0182330 A1* | 8/2006 | Chiles | 382/135 |
| 2009/0014510 A1* | 1/2009 | Cox et al. | 235/23 |
| 2009/0236431 A1* | 9/2009 | Benigno et al. | 235/7 R |
| 2009/0320106 A1* | 12/2009 | Jones et al. | 726/5 |
| 2010/0017017 A1* | 1/2010 | Adams et al. | 700/223 |
| 2010/0044426 A1* | 2/2010 | Samuels | 235/23 |
| 2010/0127070 A1* | 5/2010 | Sanders et al. | 235/379 |
| 2010/0131374 A1* | 5/2010 | Sanders et al. | 705/16 |
| 2011/0259961 A1* | 10/2011 | Folk et al. | 235/385 |

\* cited by examiner

SYSTEM AND METHOD OF RECONCILING CURRENCY AND COIN IN A CASH HANDLING DEVICE

CROSS REFERENCE TO RELATED APPLICATIONS

This application is a continuation-in-part of U.S. patent application Ser. No. 12/241,201, filed Sep. 30, 2008, and entitled "System and Method of Distributing Currency" which is incorporated herein in its entirety by reference.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow including cash recyclers which allow a retail establishment to maintain and re-use an amount of currency on-site. The cash recycler may further calculate and manage use of cash flows in real-time.

While cash recyclers allow a business to manage their cash flows in a more seamless manner, cash recyclers often require an individual to manually remove cash from the cash recycler and place it into a cash drawer or till for use in a cash register or other point of sale device. In addition, conventional systems often require that each withdrawal of currency for the cash drawer or till be requested individually and/or by keying in the number and denomination of the currency requested for each individual drawer. This process can be inefficient, time consuming and may pose a security threat because of individuals handling currency. In addition, it is possible that multiple tills or cash drawers would not have the same amount of currency at the start of a shift or day due to error in distributing the currency to the cash drawer or till. Any time funds are inaccurately credited or debited to a particular drawer, there will likely be problems reconciling that drawer at a later point. Currently, it is a time consuming process for corporate accounting, store managers, and/or cashiers to resolve these reconciliation discrepancies. Accordingly, providing an automated, reliable, duplicative means of distributing currency to one or more cash drawers or tills would be advantageous.

Further, conventional systems often require a user to manually remove currency and/or coin from a cash drawer or till in order to count the cash and/or reconcile the drawer. This process can be time consuming and prone to errors, theft, etc. Accordingly, it would be advantageous to provide an automatic system for counting cash in a cash drawer, removing cash from the cash drawer and/or reconciling cash in the cash drawer.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects of this disclosure relate to automatically determining an amount of cash, such as currency and/or coin, in a cash drawer or till. In some arrangements, one or more cash drawers may be inserted into a cash handling device, such as a cash recycler. The amount of currency and/or coin in the cash drawer may be determined, such as via scales located in the cash drawer, in the cash recycler, etc. In some arrangements, the amount may be determined by encoding data on the drawer via RFID and having a cash handling device capable of reading that information, as discussed more fully in U.S. patent application Ser. No. 12/277,892, filed Nov. 25, 2008, and entitled, "RFID Drawer Integration with Cash Handling Devices and Point of Sale Devices," which is incorporated herein in its entirety by reference. In some arrangements, the currency and/or coin may be removed from the cash drawer prior to determining the amount of cash in the drawer. In still other arrangements, the cash may be removed from the cash drawer and the drawer may remain empty until the beginning of another shift, workday, etc. Alternatively, the cash drawer may be replenished with a predetermined amount of currency and/or coin of various denominations. In other arrangements, the coin may be left in the cash drawer while the currency may be removed.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

Figure 1:
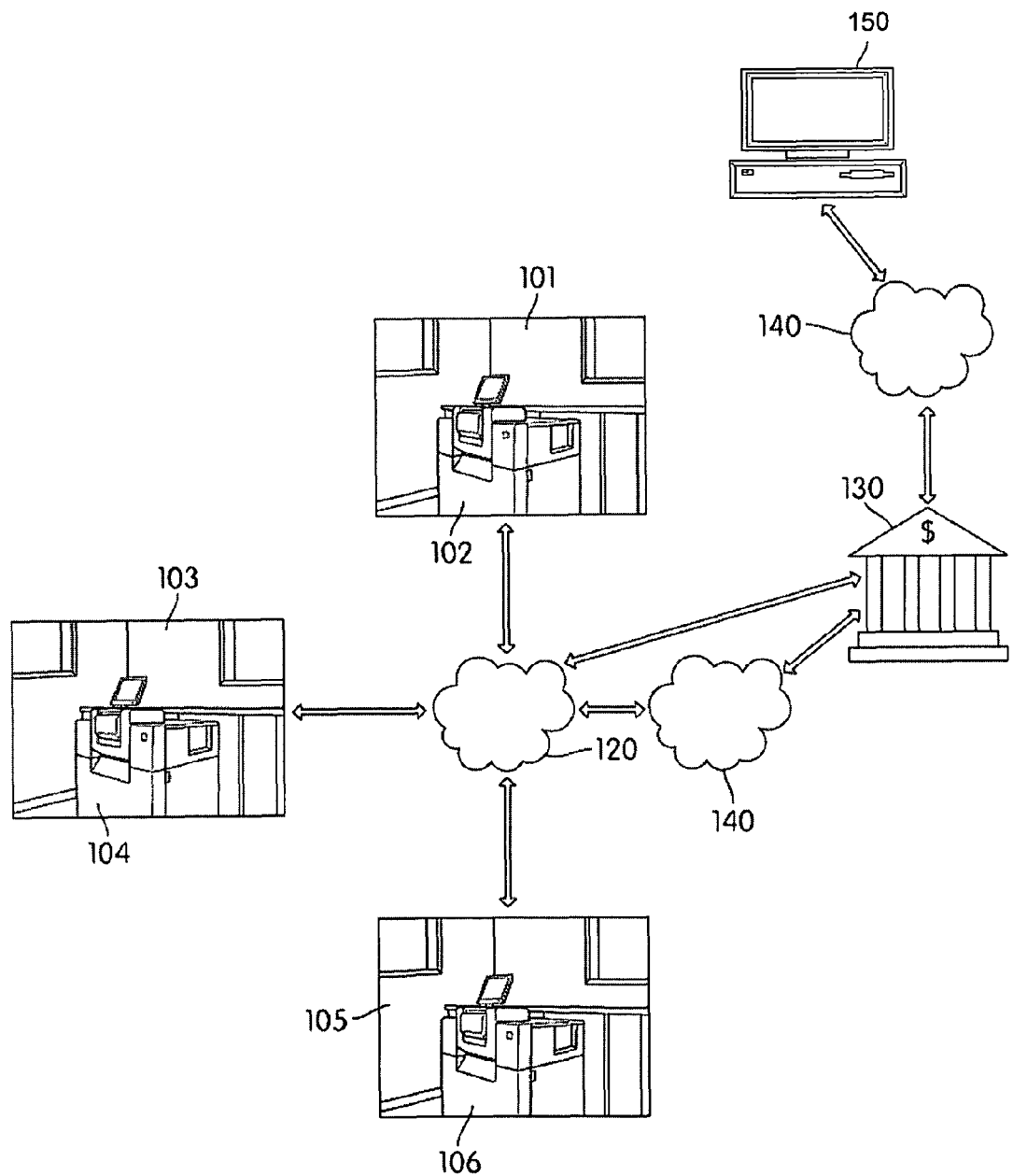
FIG. 1 illustrates an example of a suitable operating environment in which various aspects of the disclosure may be used.

FIG. 1 illustrates an example of a suitable operating environment in which various aspects of the disclosure may be implemented. Devices 102, 104, 106 may include currency recyclers and/or other cash handling devices and may be located at various sites such as locations 101, 103, and 105. The locations may represent different stores of a business enterprise. For example, locations 101, 103, and 105 may represent three different grocery stores located in different geographical areas belonging to a grocery store chain. Those skilled in the art will realize that additional cash handling devices may be located in the same store or in other stores belonging to the grocery store chain. In addition, those skilled in the art will realize that a grocery store chain is only one illustrative example of the types of locations or businesses that cash handling devices such as recyclers may be located. For example, cash recyclers may also be located in gas stations, post offices, department stores, and other places where cash and other financial instruments are deposited or withdrawn.

FIG. 1 further illustrates that cash handling devices 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash handling devices 102, 104, and 106 may communicate with one another or with a financial institution such as bank 130 via communication network 120 in various manners. For example, communications between cash handling devices 102, 104, 106 and bank 130 may use protocols and networks such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like. Communications network 120 may be directly connected to a financial institution such as bank 130. In another embodiment, communications network 120 may be connected to a second network or series of networks 140 such as the STAR network before being connected to bank 130. According to one or more arrangements, bank 130 may utilize an infrastructure which includes a server 150 having components such as a memory, a processor, a display, and a communication interface.

Figure 2:
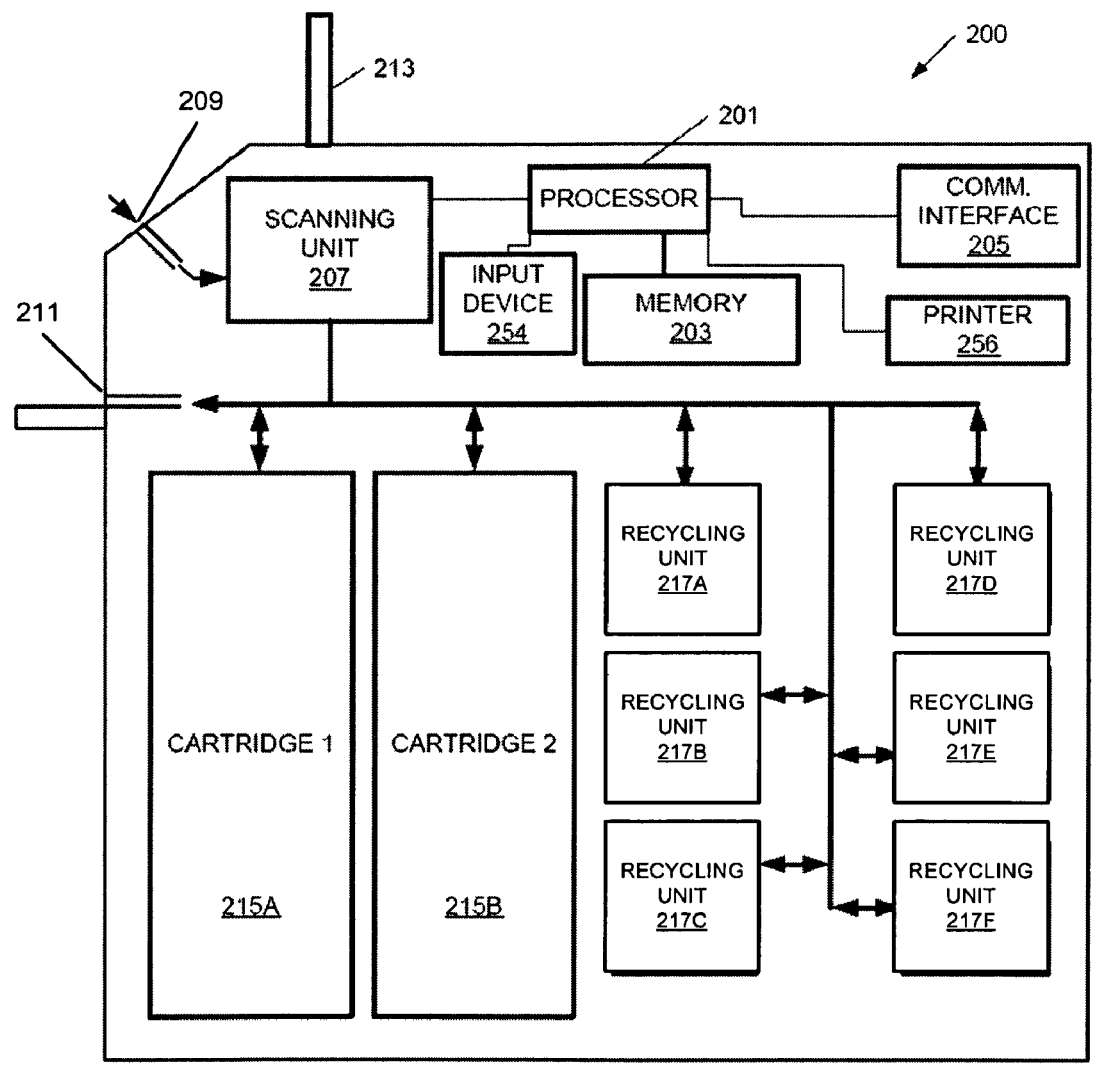
FIG. 2 illustrates a simplified diagram of a currency recycler in accordance with an aspect of the invention.

FIG. 2 illustrates a simplified diagram of a cash recycler that may be used in accordance with the operating environment of FIG. 1. Cash recycler 200 may include processor 201, memory 203, communication interface 205, scanning unit 207, display 213 and various cartridges 215 and recycling units, such as stackers and/or rolled storage modules (RSMs) 217. Processor 201 may be generally configured to execute computer-readable instructions stored in memory 203 such that, for example, cash recycler 200 may send and receive information to and from a bank (e.g., bank 130 of FIG. 1) using communication interface 205 and via a network (e.g., networks 120 and/or 140 of FIG. 1). Memory 203 may be configured to store a variety of information including the aforementioned computer-readable instructions, funds balance data, reconciliation data, user account information and the like. Additionally, memory 203 may include non-volatile and/or volatile memory. One or more databases may be stored in the memories 108, 112, and 116.

Cash recycler 200 may further provide display 213 to present data and/or messages to a user. For example, display 213 may be configured to display a recycler balance, a transaction interface, a current deposit count, security options, transportation options and the like. One or more input devices 254 such as a keypad, keyboard, mouse, touchscreen, fingerprint scanner, retinal scanner, proximity card reader, RFID scanner and/or writer, magnetic card reader, barcode reader, and/or combinations thereof, or any other type of input device or reader capable of inputting, reading, or scanning indicia or information, may also be included in or connected to recycler 200. One or printers 256 may also be included in or connected to recycler 200 for printing receipts and notifications as well.

In cash recycler 200, recycling units 217 and cartridges 215 are configured to store currency. Currency may be inserted through input slot 209 and withdrawn through withdrawal slot 211. Recycling units 217 may be used to store and organize currency based on denomination. For example, all $5 bills may be stored in recycling unit 2 (i.e., recycling unit 217B) while all $20 bills may be stored in recycling unit 3 (i.e., recycling unit 217C). Cartridges 215A and 215B, on the other hand, may be used to store overflow currency and/or currency for transport. Thus, if recycling units 217 become full, additional currency that is deposited into recycler 200 may be stored in an overflow cartridge such as cartridge 215B. One of cartridges 215 may be designated as a transport cartridge that stores currency to be withdrawn from the machine and transported to the bank. Alternatively or additionally, one or more of cartridges 215 may be used as an unfit bill store for currency determined to be defective to a degree that it should be taken out of circulation. Cartridges 215 and recycling units 217 may further be removable for easier access or transport.

Scanning unit 207 may be configured to scan each bill or currency that is inserted into recycler 200. Scanning unit 207 may be configured to detect defects, counterfeits, denomination, type of currency (e.g., which country the currency originates from) and the like. Scanning unit 207 may further be configured to refuse money (either through input slot 209 or withdrawal slot 211) if it cannot be properly recognized or if the currency is deemed to be counterfeit. Scanning unit 207 may send such data to processor 201 which may, in turn, save the data in memory 203.

Further, recycler 200 may include one or more mechanical or electromechanical systems (not shown) for automatically transferring currency between recycling units 217, cartridges 215, input slot 209 and withdrawal slot 211 in recycler 200. For example, currency may automatically be withdrawn from recycling units 217 and directed into cartridge 215A for storage using a series of motorized rollers. In another example, currency stored in cartridge 215A may be withdrawn and organized and stored into recycling units 217 according to denomination. Using such systems to facilitate the automated movement of currency between storage components and other portions of recycler 200 may provide efficiency and security by alleviating some of the need to manually handle currency stored within recycler 200.

Figure 3:
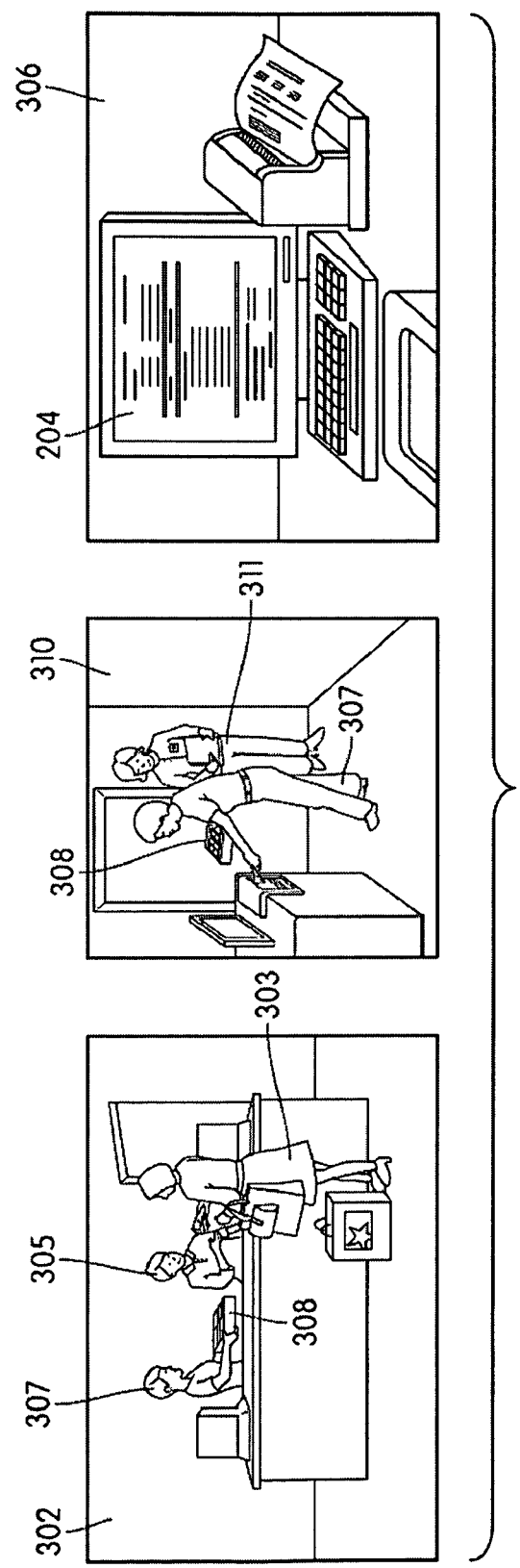
FIG. 3 illustrates various features of a currency recycler that may be used in accordance with aspects of the invention.

FIG. 3 illustrates various features of cash recycler, such as cash recycler 200 of FIG. 2, used in various aspects of the invention. The images in FIG. 3 depict use of a single cash recycler 200 in a retail environment. The retail owner may have a cash recycler 200 located in each of their stores. In an aspect of the invention, summary information for the retail owner's stores may be available via an interface to the financial institution. In another embodiment, access to summary information may be available directly from each of the cash recyclers 200.

In FIG. 3, image 302 depicts customer 303 paying cash to a retail employee such as store cashier 305 for a purchase. Another store cashier 307 at a recently closed cash register may be carrying a cash drawer or till 308 to a back office for reconciliation. In image 310, store cashier 307 may load currency from cash register till 308 into cash recycler 200. In addition, store cashier 307 may also deposit other paper forms of payment received from customer such as checks. An office manager 311 may be supervising cashier 307 during the loading of cash register till 308 into cash recycler 200. Moreover, upon the start of a shift a cashier may fill his/her cash register till with a designated amount of currency dispensed from cash recycler 200.

In image 306 of FIG. 3, a display screen (e.g., display 213 of cash recycler 200 of FIG. 2) may show the total amount entered into cash recycler 200 from till 308. The display screen 213 may breakout the amount entered into cash recycler 200 by denomination and by each cashier. The total amount deposited and withdrawn from cash recycler 200 may be shown on display screen 213.

Figure 4:
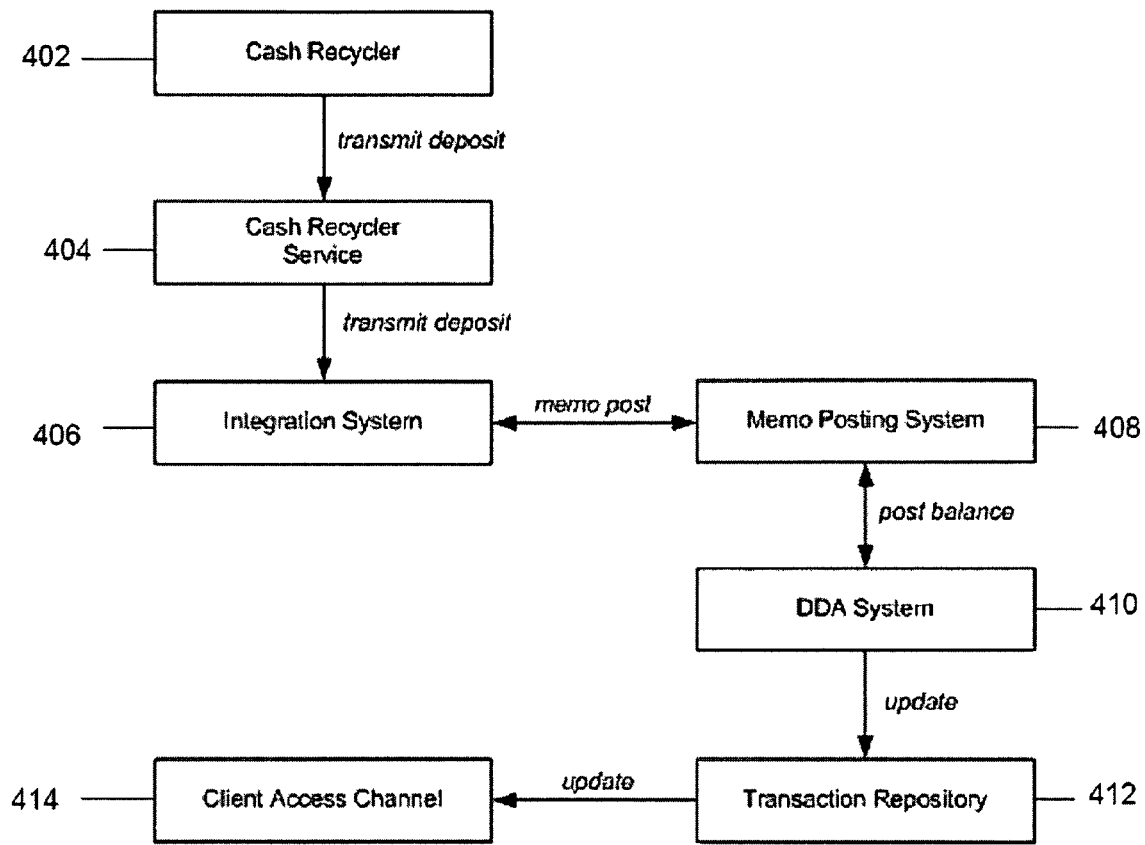
FIG. 4 illustrates additional features of a currency recycler used in various aspects of the invention.

FIG. 4 illustrates a system configuration that may be used in accordance with an aspect of the invention. In FIG. 4 a cash recycler 402 may communicate information to cash recycler service 404 located at a remote location. For example, cash recycler 402 may communicate deposit and withdrawal information from an enterprise location (e.g., a retail store) to the remote cash recycler service 404. The information may be routed through various networks such as the Internet to reach the cash recycler service. The cash recycler service 404 may be located in the data center of a financial institution. The cash recycler service 404 may communicate with an integration system 406 which provides access to the financial systems and processes. The integration system 406 may communicate with a memo posting system 408 which may perform posting activity. The posting system 408 may update the appropriate DDA (direct deposit account) system 410 to reflect the balance changes in the enterprises account balances. The DDA system 410 may also update a transaction repository 412 for historical and intra-day reporting purposes. An enterprise employee may access information stored in the transaction repository 412 through a client access channel 414 via web browser. Those skilled in the art will realize that the financial institution may allow the enterprise user to access the information stored in the transaction repository via numerous alternative communication methods.

According to one aspect, cash recyclers such as cash recycler 102 (FIG. 1) and 200 (FIG. 2) and other cash handling devices may facilitate real-time recognition of funds. In particular, funds deposited at a recycler or other cash handling device at a client site may be recognized by a bank at the time the deposit is made. Recognition refers to the real credit (i.e., not provisional) of deposited funds into a client's account. In contrast to current systems, there is no delay between a deposit of funds and when the funds and transaction data are submitted to the bank for recognition. Thus, instead of having to wait until the end of the day or another prescheduled time for deposits and/or withdrawals to be recognized by the bank, each deposit is processed for recognition in real-time. Data regarding the withdrawal or deposit transaction may be transmitted through a data network to the bank for recognition and processing. Providing real-time recognition offers may advantages including the ability for a client to withdraw the same currency that was earlier deposited for use in the client's operations, all at the client site and without having to first transport the deposited funds to the bank for recognition. Currency recyclers, recycling management and recognition of funds are further described in U.S. application Ser. No. 11/614,656, entitled "Commercial Currency Handling and Servicing Management," filed on Dec. 21, 2006, the content of which is incorporated herein by reference in its entirety.

In some arrangements, cash recyclers may be used to distribute currency to one or more cash drawers or tills, such as a till for a cash register or other point of sale system. The system and method described herein permits a user to pre-configure the amount of currency to be distributed to each till. Further, the preconfigured amount of currency may include the number of bills of each denomination to distribute to each till. In some arrangements, the amount of preconfigured currency is identical for each till to ensure that each point of sale system has the same amount of currency in the till. This aids in balancing funds at the end of a shift, end of a day, etc. In addition, the cash recycler described herein may include one or more slots into which a till may be inserted. Upon insertion of a till, the cash recycler may automatically distribute the preconfigured amount of currency to each till.

Figure 5:
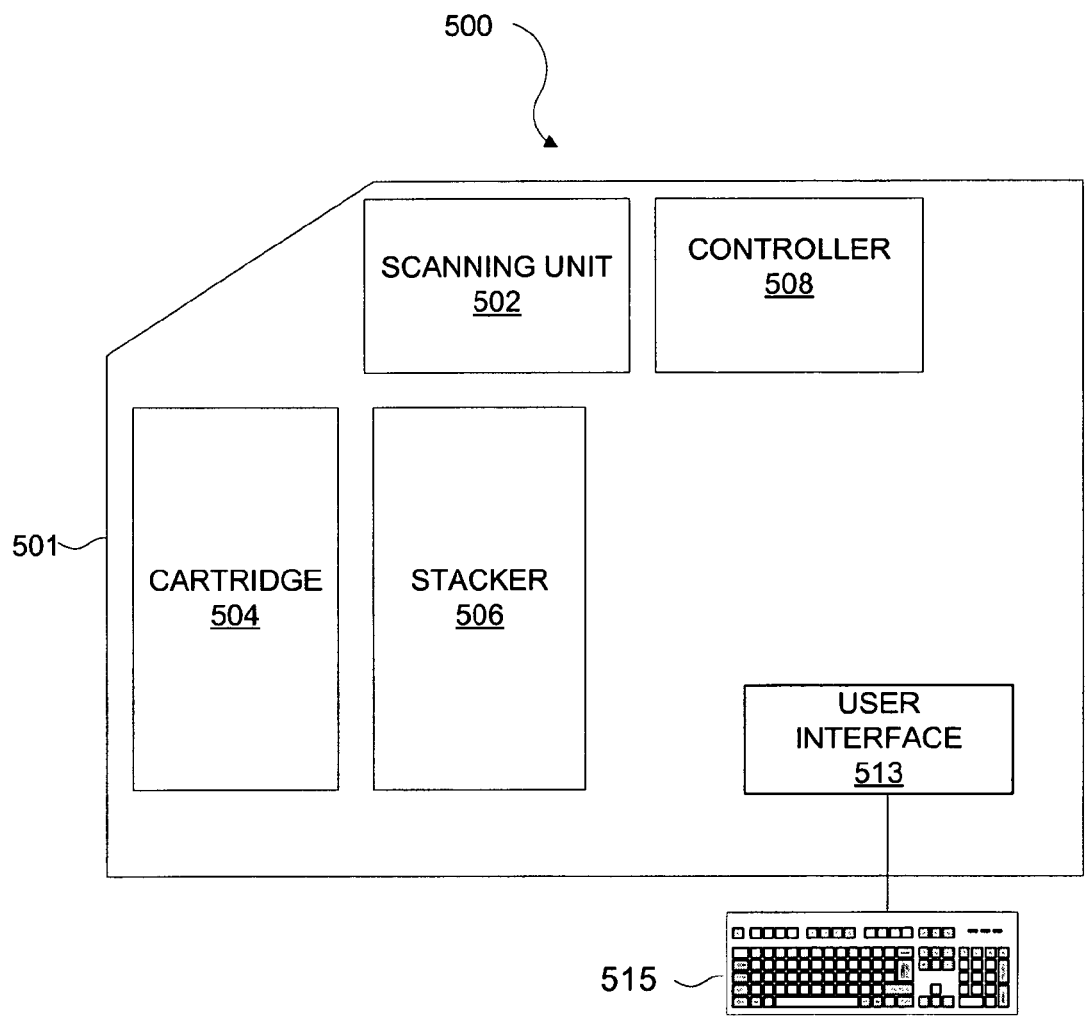
FIG. 5 is a schematic diagram of a currency recycler including various components used in accordance with one or more aspects of the invention.

FIG. 5 illustrates an example cash recycler 500. The cash recycler 500 or other currency handling device described above may include various components. For instance, the cash recycler 500 may include some or all aspects of the cash recycler 200, as shown in FIG. 2. The cash recycler 500 of FIG. 5 includes a controller 508 configured to process transactions including transmitting data to a financial institution for recognition at the financial institution, control mechanical systems of the cash recycler 500, control access to one or more portions of recycler 500, reconcile logical and physical counts of funds and the like. The controller 508 may be an external component or may be integrated into the cash recycler 500. The controller 508 generally includes a processor and memory such as RAM and ROM (not shown). In addition, the controller 508 may include or have access to storage and include user interface 513. The user interface 513 may include a display as well as various input devices such as a keyboard 515, mouse, etc. In some arrangements, the display may be a touch-sensitive display thereby allowing user input to be received through the display. Additionally or alternatively, the user interface 513 may be configured to receive voice commands. The controller 508 may further be configured to control various peripheral devices, such as a printer, external storage device, speakers and the like using one or more adapters and interfaces (not shown).

The controller 508 is further configured to execute software for providing functionality to the cash recycler 500. For instance, the controller 508 may execute commands as directed by the software instructions to control transactions made using the currency recycler 500, communicate with the financial institution or other entity, provide outputs via the user interface 513 or a peripheral device, such as a printer, and also to physically move the currency within the cash recycler 500.

In one example, a user may deposit $1000 into the cash recycler 500. The user provides input through the user interface 513 regarding the deposit. This user input may include selection from a display, voice commands, and the like. The money is then deposited into the cash recycler 500. In one arrangement, the controller 508, in response to various instructions provided by software, may control the mechanical systems of the cash recycler 500, as well as the electronic (e.g., a communications interface) systems of the cash recycler 500. For instance, the controller 508 may operate the mechanical system that controls the flow of currency into the machine during a deposit. In another arrangement, the controller 508 may house the software configured to send and receive transaction data between recycler 500 and a remote device through a communication interface. In addition, the controller 508 controls the scanning device 502 to scan each bill inserted into the cash recycler 500 to confirm authenticity and to verify the condition of the bill. If a bill is deemed to be counterfeit, it may be removed from circulation and stored in a separate region of the cash recycler 500. In particular, the controller 508 may engage various mechanical systems such as automated rollers to store the bill in the separate region. If the bill is deemed too worn to be returned to circulation, the mechanical systems operated by the controller 508 may remove the bill and place it in a separate region for storage. If the bill is deemed suitable to return to circulation it may remain or be placed with the bills in the recycler 500 that are eligible for recirculation from recycler 500. Further, controller 508 may reconcile a deposit amount specified by a depositing user and a physical count of the currency actually deposited to insure accuracy and integrity. In addition, the controller 508 may store data related to the amount of currency inserted into the cash recycler 500, as well as the amount of currency removed from circulation for various reasons. In still other examples, the controller 508 may aid in transmitting the cash transaction information to the financial institution. Additionally or alternatively, the controller 508 may forward a communication, such as an email, to an email box reporting the cash transaction. In still other arrangements, the controller 508 may forward a report of the cash transaction to a peripheral device, such as a printer, to print the report as a record of the cash transaction.

Additionally or alternatively, access to the various functions of the cash recycler 500 may be password protected or may require other authorization, such as use of a radio-frequency identification (RFID) badge and authentication before a user may perform or adjust those functions. In one arrangement, biometric data, such as fingerprint, iris scan, and the like, may be used to authenticate a user of the cash recycler 500 to permit adjustment to various settings. In addition, access to the internal portion of the cash recycler 500 may be restricted to only authorized users. The cash recycler 500 may include one or more locks to prevent unauthorized access to the internal portion of the cash recycler 500. Integrating the controller 508 within the cash recycler 500 provides such additional security to prevent unauthorized access to the computer systems and internal portion of the cash recycler 500 and reduces the ability of would-be intruders to hack into the controller 508 and bypass such security measures.

Figure 6:
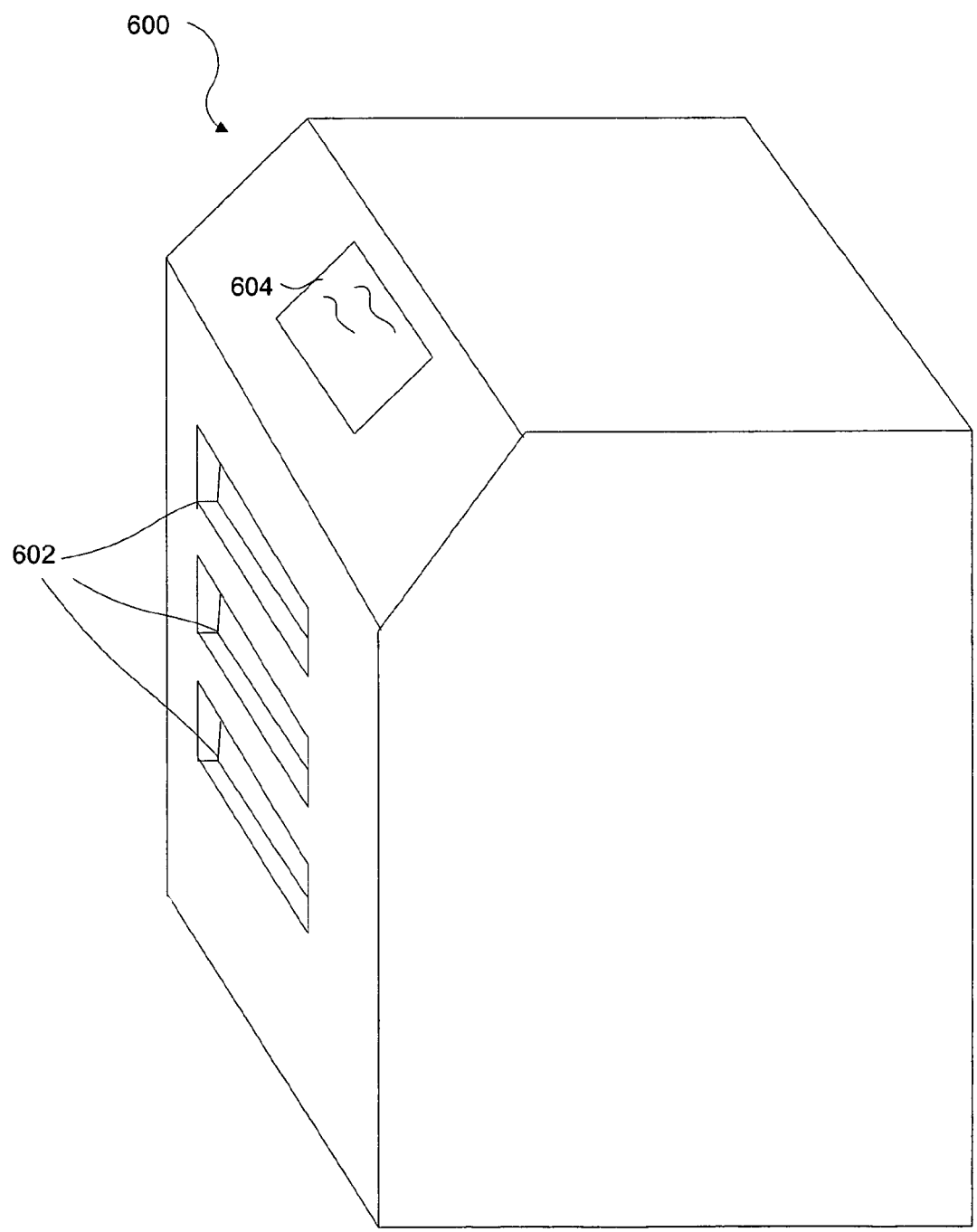
FIG. 6 is a perspective view of an example currency recycler having a plurality of cash drawer slots in accordance with aspects described herein.

FIG. 6 illustrates one example cash handling device, such as a cash recycler 600 according to aspects described herein. The cash recycler 600 includes many or all of the features of the cash recycler shown in FIG. 2. In addition, the cash recycler 600 includes one or more apertures or slots 602 into which a till or cash drawer may be inserted. For instance, a user may pre-configure an amount of money to be distributed to each till, for example, using the user interface 604 of the cash recycler. A user may then insert a till into one of the slots 602 of the cash recycler 600. Upon insertion of the drawer, the cash recycler 600 will distribute the preconfigured amount of currency to the drawer. The drawer may then be removed and taken to the cash register or other point of sale unit. An acknowledgement or other indication that the currency has been distributed to the drawer may then be sent. In some arrangements, the acknowledgement may be sent via email or may be sent to a peripheral device, such as a printer.

Figure 7:
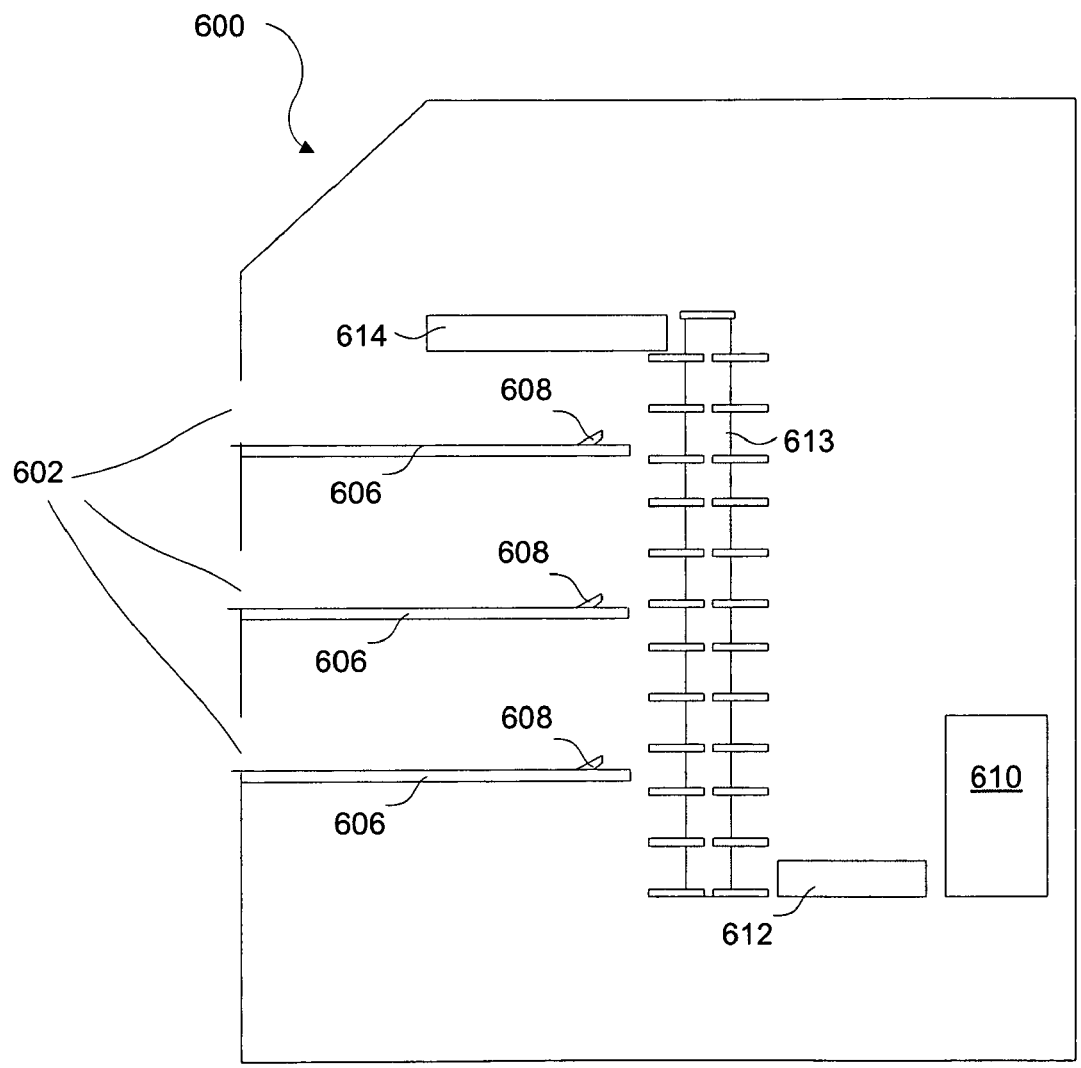
FIG. 7 is a side view of the cash recycler of FIG. 6.

FIG. 7 is a schematic side view of the cash recycler 600 of FIG. 6. As shown in FIG. 7, the cash recycler 600 includes three apertures 602 or slots into which a till or cash drawer may be inserted. In some arrangements, only a single slot 602 may be provided. In other arrangements, two or more slots 602 may be provided. In arrangements having a single slot 602, the cash recycler 600 can distribute cash to and/or receive cash from the single drawer upon insertion of the drawer into the slot 602. If multiple tills or drawers are used with a cash recycler 600 having a single slot 602, the user may insert the tills consecutively, i.e. one after another. The cash recycler 600 will distribute the currency to the drawer inserted and, when complete, the drawer may be removed and a second, third, fourth, etc. till may be inserted.

In arrangements such as the cash recycler 600 of FIG. 7, multiple slots 602 are provided. Accordingly, multiple tills may be inserted simultaneously. Once each drawer is inserted, the cash recycler 600 will distribute the predetermined amount of cash to each till. When complete, the tills may be removed and taken to the cash register or other point of sale system where they will be in use.

In addition, each slot 602 of the cash recycler 600 shown in FIG. 7 has a track or runner 606 to support the till when it is inserted in the cash recycler. In some arrangements, the track or runner 606 may include a sensor 608 to indicate that the drawer is fully inserted and the cash recycler 600 may dispense the currency. The sensor 608 may be any known type of sensor including mechanical, optical, weight sensor, and the like.

In distributing the currency to the till, the currency may be transferred from a storage area, such as storage area 610. The currency may be transferred to the drawers via known methods of moving cash through a cash recycler 600. For instance, the method of transfer may include one or more conveyors 612, 613, 614 a series of rollers, and the like. For example, the arrangement of FIG. 7 may use a plurality of conveyors 612-614 to transfer currency from the storage area 610 to the at least one till.

Figure 8:
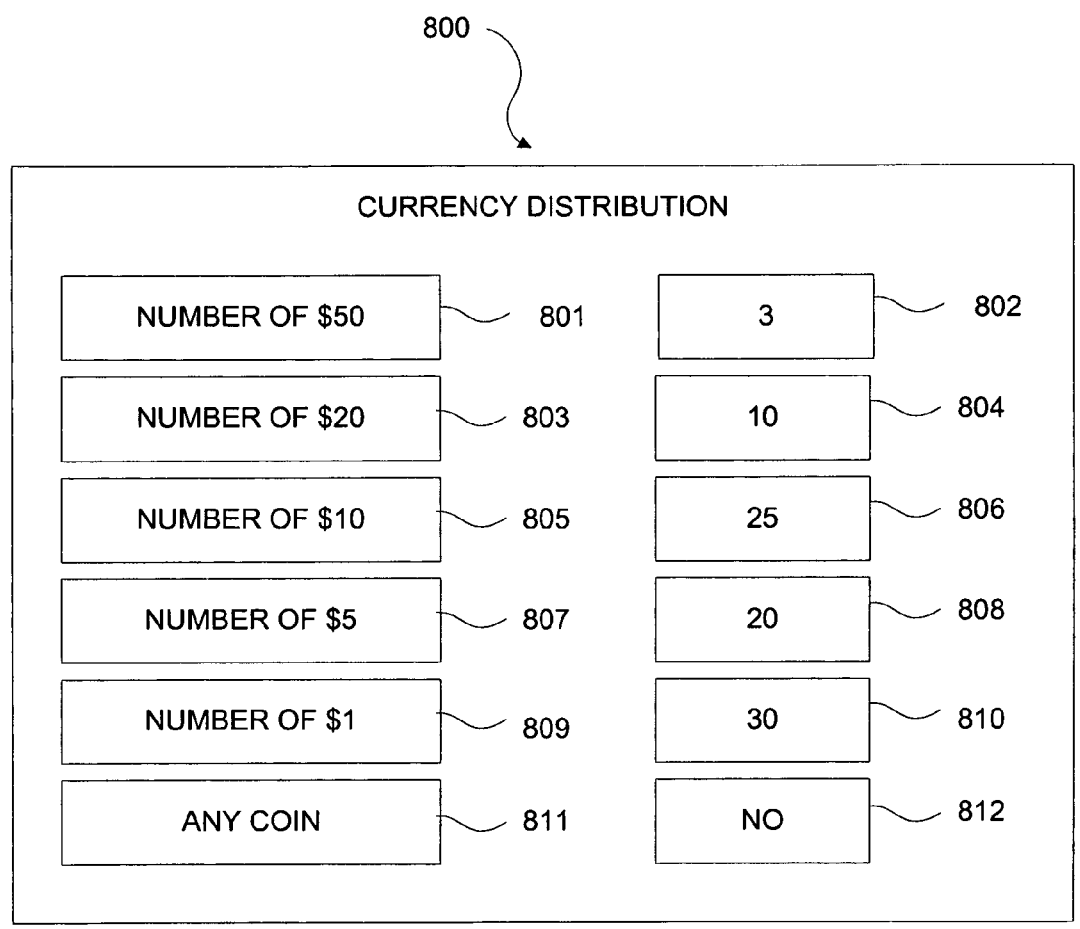
FIG. 8 illustrates one example user interface for preconfiguring the amount of currency to be distributed to a cash drawer according to aspects described herein.

The cash recycler 600 may include a plurality of user interfaces to configure the amount of currency to distribute to each till. For instance, FIG. 8 illustrates one example user interface 800 to configure the amount of currency distributed to a till. In the example of FIG. 8, each of fields 801, 803, 805, 807, 809 indicates a denomination of bills to be distributed to the till inserted into the cash recycler. For instance, field 801 indicates the number of $20 bills to distribute, etc. A user may configure the number of bills of each denomination in each of fields 802, 804, 806, 808, and 810. In order to make a selection of a number of bills, a user may select the field 802, 804, 806, 808, 810 using known means of selection, such as clicking in the field, double clicking in the field, and the like. Once the field is selected, the user may indicate the number by typing the number in the field, selecting a number of bills from a drop down list, selecting a radio button associated with a selection, and the like.

In some arrangements, the cash recycler may distribute rolled or loose coins to a cash drawer or till. User interface 800 permits a user to select whether coins will be distributed as well as bills in field 812. If the arrangement includes use of coins, the number of rolls of coins or of coins of each denomination may be configured in a separate user interface similar to user interface 800.

Figure 9:
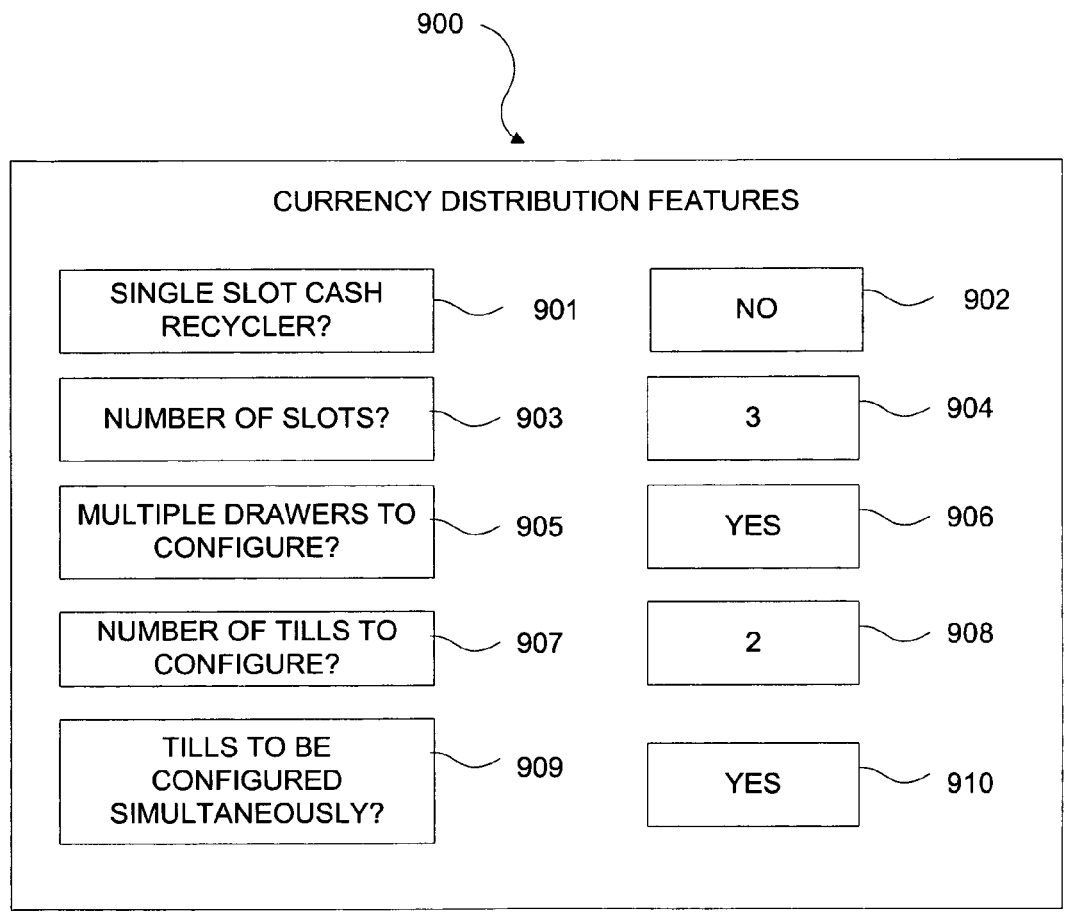
FIG. 9 illustrates an example user interface for configuring various aspects of the cash distribution system according to aspects described herein.

FIG. 9 illustrates an example user interface 900 for configuring one or more features of the currency distribution system described herein. In field 901, a user may configure the type of cash recycler being used. That is, the user may select whether the cash recycler has a single slot or multiple slots. In field 902, the user may indicate that the cash recycler has a single slot with a yes or a no in field 902 would indicate that the cash recycler has multiple slots. In field 903, the user may configure the number of slots for receiving a cash drawer in the cash recycler. In field 904, a user has indicated that the cash recycler has three input slots capable of accepting 3 drawers concurrently.

Although the cash recycler may have multiple slots, a user may only configure a single drawer or, in some arrangements, may configure multiple drawers. Field 905 indicates that a user may select to configure a single drawer or multiple drawers, regardless of the number of slots in the cash recycler. Field 906 indicates that the user has multiple drawers to configure. Region 907 permits a user to indicate the number of tills or drawers to configure. Field 908 indicates that a user has three tills or drawers to configure in the arrangement shown in FIG. 9. Region 909 permits a user to configure the tills simultaneously or consecutively, i.e. one after another. In field 910 a user has determined to configure the tills simultaneously. That is, in a cash recycler having multiple slots, the user will insert multiple tills into the cash recycler and all of the tills will be configured simultaneously.

Figure 10:
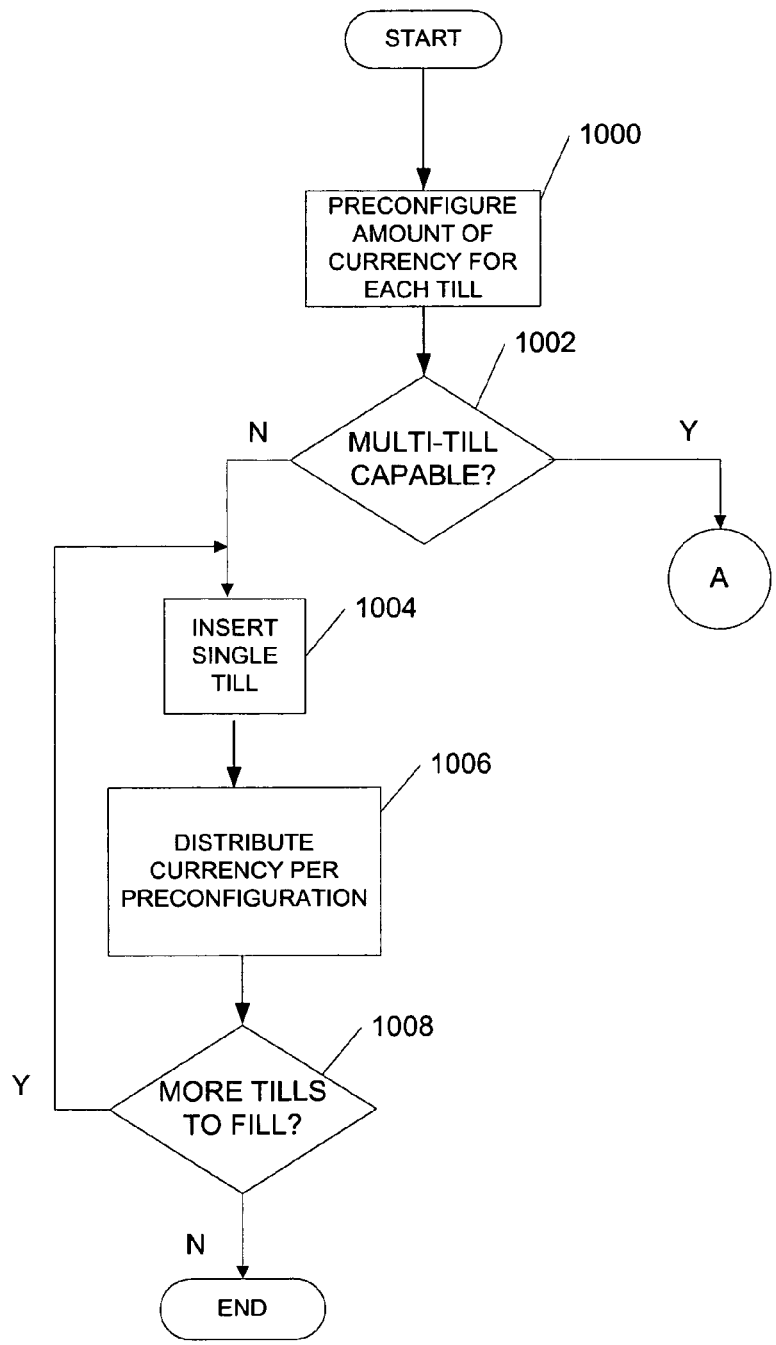
FIG. 10 is an example method of filling a single cash drawer according to aspects described herein.
Figure 11:
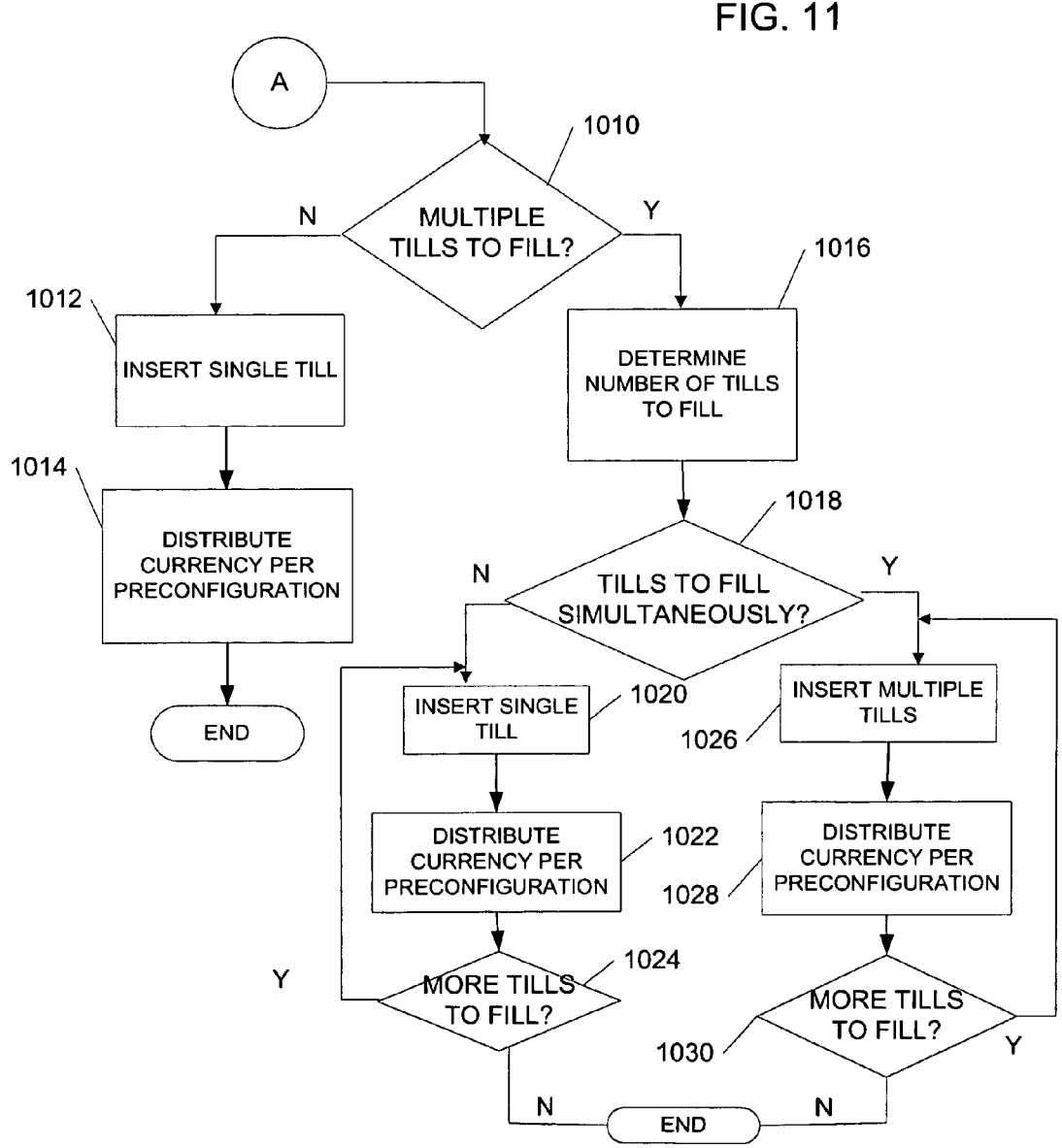
FIG. 11 is an example method of filling multiple cash drawers according to aspects described herein.

FIG. 10 illustrates one example method of distributing a preconfigured amount of currency to a cash drawer or till. In step 1000, a user may preconfigure the amount of currency to distribute to each till. In some arrangements, there may be various types of tills, i.e., front desk tills, drive through tills, and the like. Each type of till may then have one or more preconfigured fills. For instance, if the first shift of the day is generally the busiest, one preconfigured fill for that shift for a certain type of till may include more currency then a third shift fill for that till which may be a less busy shift. This arrangement will be discussed more fully below with respect to FIG. 12. In step 1002, a determination is made as to whether the cash recycler is multi-till capable. That is, a determination is made as to whether the cash recycler includes multiple slots or a single slot. If the cash recycler has a single slot, a single till or cash drawer is inserted into the slot in step 1004. In step 1006, the preconfigured amount of currency is distributed to the till or cash drawer inserted into the cash recycler. In step 1008, a determination is made as to whether currency should be distributed to additional tills. If yes, the first till is removed from the slot and a second till may be inserted into the slot. The currency is then distributed to that till and the process continues until there are no additional tills to fill. In one or more arrangements, each distribution of currency to a cash drawer, i.e., fill, may be considered an individual transaction. As such, a fill may be interrupted for one or more reasons, such as an emergency stop is needed, a mistake has been made, etc. In addition, there may be an indication on the display that a certain fill of a given till is "fill X of Y." For instance, there may be five tills to fill and, as the third cash drawer is being filled, the display may indicate "till 3 of 5" is being filled. An option to cancel the current fill may also be provided. The fill may also end midstream on a timeout indication. That is, if the cash drawers have been filled but remain in the cash recycler for a predetermined amount of time, no additional cash drawers may be filled using the filling process used for the timeout tills. Instead, the fill process would be restarted in order to fill the remaining cash drawers. These arrangements may be used with single slot and multi-slot cash recyclers.

If the cash recycler is multi-till capable, i.e., has multiple slots, a determination is made, at step 1010 as to whether a user has multiple tills to fill. If the user has only a single till or cash drawer to fill, the user will insert the till into one of the plurality of slots in the cash recycler in step 1012. Once the drawer is inserted, the preconfigured amount of currency will be distributed to the till in step 1014. The till may then be removed from the cash recycler and taken to a cash register or other point of sale device.

If the user has multiple tills to fill in step 1010, a user may indicate the number of tills to which currency will be distributed in step 1016. In some arrangements, the cash recycler may determine the number of tills to fill based on the number of tills inserted into the cash recycler at the time. In step 1018, a user may indicate whether the tills are to be filled simultaneously (i.e., several tills are inserted into slots in the cash recycler and all are filled simultaneously) or consecutively (i.e., one drawer is inserted and filled at a time, followed by another drawer, etc.). If the drawers are to fill consecutively, a single till is inserted into the cash recycler at step 1020. The preconfigured amount of currency is distributed to the cash drawer in step 1022. In step 1024, a determination is made as to whether there are additional tills or cash drawers to fill. If so, the user may be prompted at a user interface to remove the first drawer from the cash recycler and insert a second drawer, prompting the preconfigured amount of currency to be distributed, etc. The process continues until there are no additional tills to fill. In most retail locations the same number of tills with the same cash mix are built each day. As such, an entire sequence of fills may be pre-programmed via the user interface and initiated via a button on the user interface. This sequence may include, for example, 21 drawers with Preconfigured Denominational Mix A, and 5 drawers with Preconfigured Denominational Mix B. The user interface may guide the user through this process by prompting her to insert and remove certain drawers into certain slots at specific points during the sequence. Additionally or alternatively, the cash handling device may recognize, via RFID for instance, certain drawers and dispense appropriate amounts as the recognized drawer is inserted.

If the tills or cash drawers are to fill simultaneously in step 1018, multiple tills may be inserted into the multiple slots of the cash recycler in step 1026. The preconfigured amount of currency is simultaneously distributed to each of the cash drawers in step 1028. In step 1030, a determination is made as to whether there are additional cash drawers to fill. If so, the first tills are removed from the cash recycler and additional drawers are inserted. For instance, in some arrangements, the cash handling device may dictate that all drawers must be inserted if a particular preconfigured till sequence is initiated. In other arrangements, the fills may be more of an adhoc process and the cash handling device may recognize and dispense appropriate combinations of denominations to the drawers inserted. The process continues until there is a determination that there are no additional tills or cash drawers to fill. In addition, each till may include a bar code, RFID tag or other unique identifier which will identify the drawer itself and/or the amount of currency of each denomination the drawer received when filled. This arrangement will aid in identifying the drawer at the end of a shift or whenever the drawer is returned to the cash recycler to ensure a proper count of currency is maintained.

Figure 12:
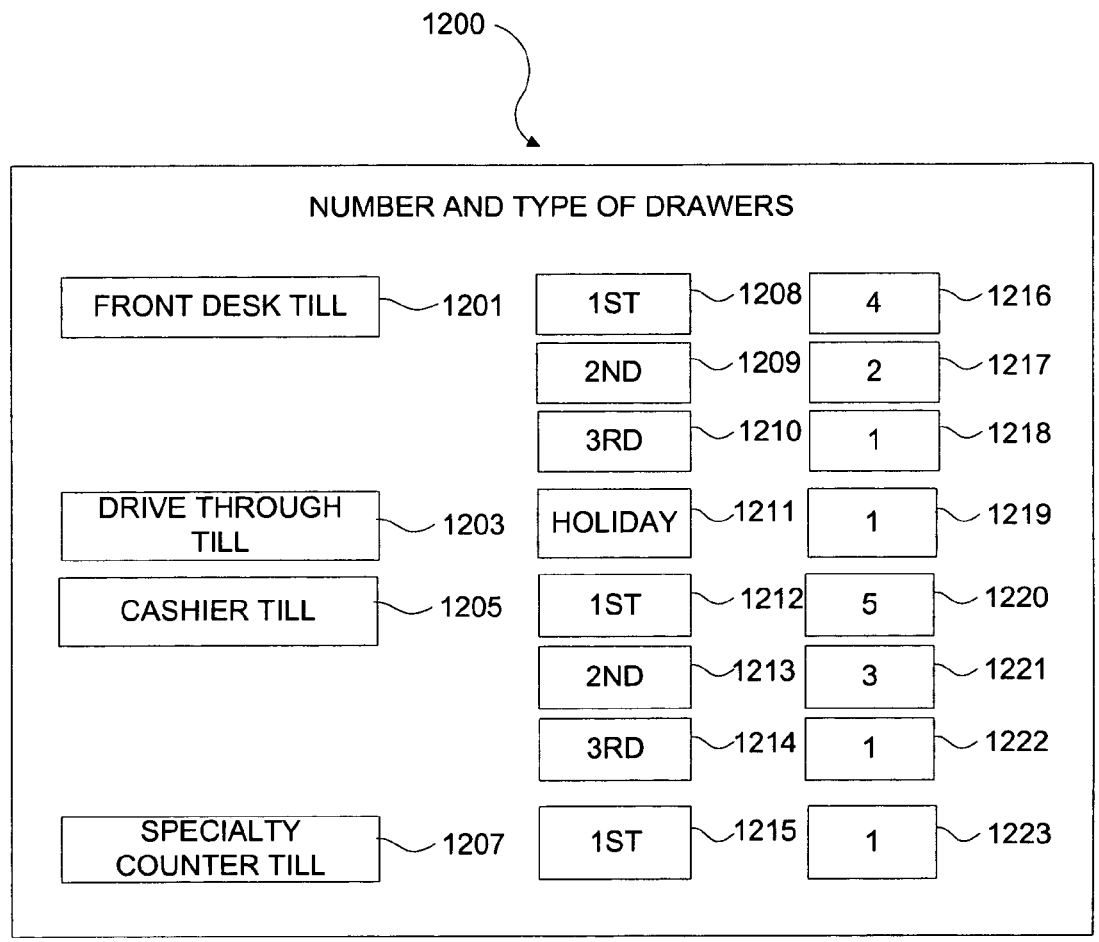
FIG. 12 illustrates another example user interface for configuring various aspects of the cash distribution system according to aspects described herein.

FIG. 12 illustrates another user interface 1200 that may be used to configure various aspects of the currency distribution system described herein. In some arrangements, a user may preconfigure the number of each type of till to distribute, i.e., user may input a request to fill x number of cash drawers that may be used in a particular location, point of sale units, etc. For instance, user interface 1200 includes options to preconfigure various types of cash drawers or tills, such as front desk till 1201 that may be used at a front desk or customer service type station, drive-through till 1203 for use in a register or point of sale system at a drive-through window, cashier till 1205 that may be used at one or more cash registers or point of sale systems in a retail store, and specialty counter till 1207 that may be used in a specialty department, such as electronics, automotive, etc. The types of tills, i.e., drive-through till, customer service till, cashier till, etc., may be preconfigured in advance of insertion of any drawers. That is, the retail store may input various preconfigured till that are used repeatedly for filling various tills on various shifts, days, etc. The preconfigured till may be, for instance, selected from a drop down menu or, in another arrangement, a "custom" option may be selected from the drop-down to enable a user to customize the denominations for the till being filled.

Fields 1208-1215 are regions configured to receive user input regarding a particular shift for which a certain till will be used. The currency distribution or fill for each shift may be predetermined and may include the number of bills of each denomination to be distributed to each till of that type for that shift. For instance, a front desk till can be configured for first, second or third shift in regions 1208-1210 in order to accommodate changes in business between each shift. Additionally or alternatively, the drive-through till 1203 may be configured for a "holiday" shift, as shown in field 1211. Fields 1216-1223 are configured to receive user input regarding a number of tills of each type that will be filled. For instance, field 1220 indicates that 5 cashier tills having a first shift fill will be loaded. The user may input selections for the type of till, number of tills, and type of fill via known user input methods, such as clicking or double clicking in the region and typing the desired entry, selecting from a drop-down menu, selecting a radio button associated with the desired selection, and the like.

In some arrangements, particularly in a retail store, the same or similar cash mix of denominations may be used for the start of each day. Accordingly, the cash handling device may be configured to recognize a particular drawer and automatically dispense the preconfigured mix of bills for that particular drawer. Additionally or alternatively, the cash handling device may be configured to recognize the drawer inserted or being inserted, as well as additional factors such as time of day, day of week, etc. and will automatically distributed the preconfigured mix of bills for that particular drawer and for the additional factors recognized. In other arrangements, the cash handling device may recognize the sequence of drawers being inserted, rather than time of day etc. In this arrangement, the first drawer inserted (and in some arrangements recognized by the cash handling device) would automatically receive a preconfigured first shift mix of bills, the second drawer inserted would automatically receive a preconfigured second shift mix of bills, etc.

With further reference to FIGS. 6 and 7, the example cash recycler 600 may also be used to remove cash, including currency and coin, from one or more cash drawers or tills, in order to reconcile the one or more cash drawers. For instance, one or more cash drawers may be inserted into aperture(s) 602. The sensor 608 may provide an indication that the one or more cash drawers have been inserted into the aperture(s) 602. In some arrangements, the sensor may provide an indication that the drawer has been fully inserted into the aperture 602 or that the insertion is incomplete, thereby requiring a user to fully insert or reinsert the cash drawer into the aperture 602 in order to continue the cash removal and reconciling process.

Once the drawer is inserted into the cash handling device 600, the currency and or coin in the cash drawer may be counted. In some arrangements, the currency may be counted using scales to weigh the currency, as will be discussed more fully below. Other known methods and means of counting the currency may be used, and, in some arrangements, an RFID tag maybe encoded with an expected amount at a point of sale system. Additionally or alternatively, the coin in the cash drawer may also be counted. In some arrangements, the coin may be weighed to determine the amount of coin in the cash drawer, as will be discussed move fully below.

In some arrangements, the currency and/or coin may be removed from the cash drawer in order to determine the amount of currency and/or coin in the cash drawer. In these arrangements, known mechanical systems, such as rollers, conveyors, etc. may be used to remove the currency and/or coin.

Once the amount of cash in the cash drawer is determined, the amount in the drawer may be reconciled with an amount expected to be in the cash drawer. This process of counting the cash in the drawer and reconciling the drawer according to aspects described herein may be performed without any additional user input once the cash drawer has been inserted into the cash handling device. For instance, a user may insert one or more cash drawers into the cash handling device and the cash handling device may automatically determine the amount of cash in the cash drawer and reconcile the drawer, without requiring any additional input from the user.

Figure 13:
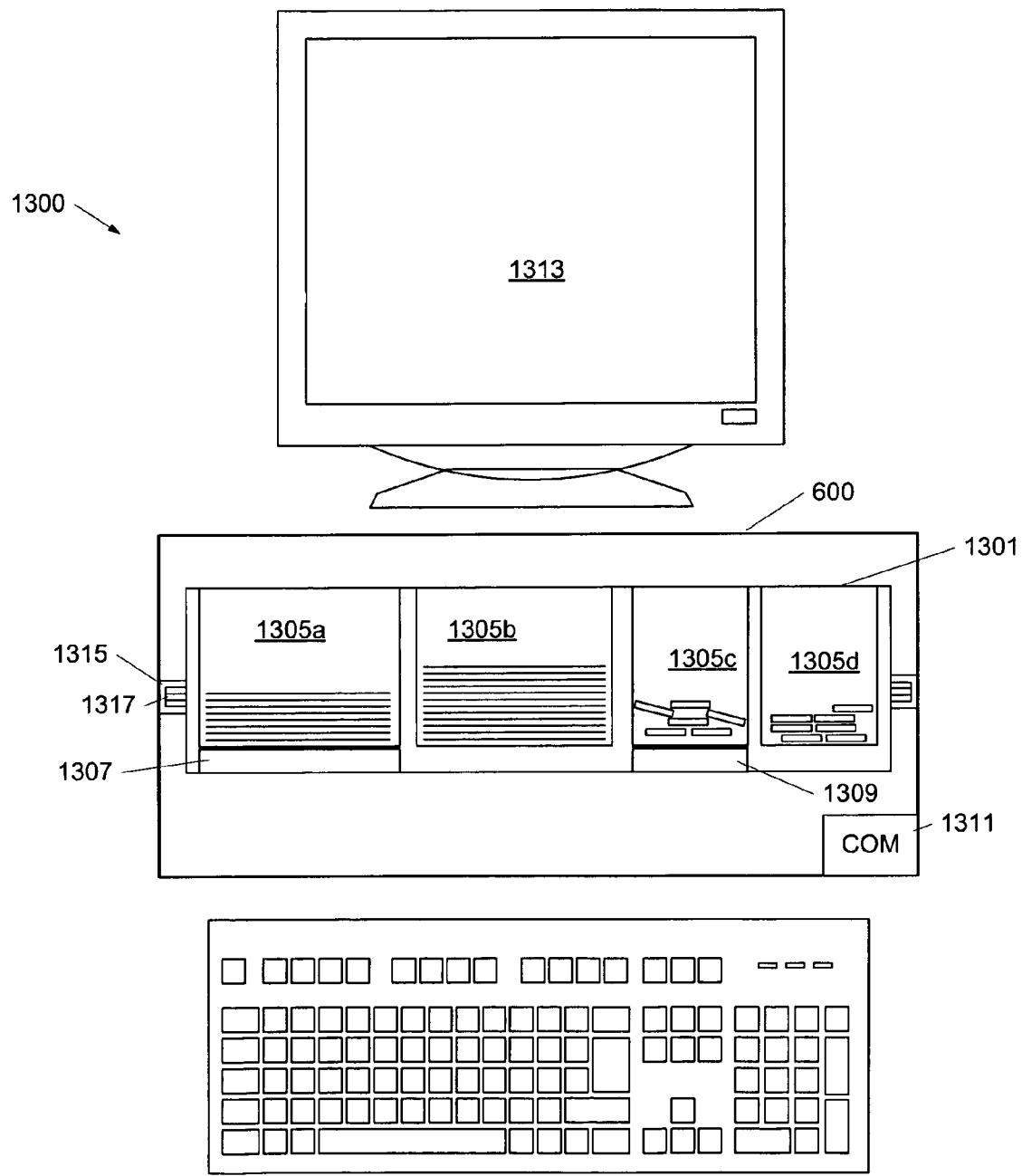
FIG. 13 is an example system for use with the cash counting and reconciling system according to aspects described herein.

With reference to FIG. 13, a system 1300 is shown that includes cash drawer 1301 configured to slide in and out of a cash handling device, such as cash handling device 600 shown in FIGS. 6 and 7. A portion of the cash handling device 600 is shown in FIG. 13. Cash drawer 1301 may be configured to store both currency and coin. In addition, cash drawer 1301 may include multiple compartments 1305 for storing different denominations of currency and coins, a currency scale 1307 and/or a coin scale 1309 that may each be used to determine an amount of currency and coin, respectively, currently stored in the cash drawer. That is, one or more scales used for weighing the currency and/or coin to determine the amount of cash may be arranged within the cash drawer 1301, as described in U.S. patent application Ser. No. 12/277,867, filed Nov. 25, 2008, and entitled, "Integrated Currency Scales" and incorporated herein by reference in its entirety. In other arrangements, the one or more scales may be arranged within the housing of the cash handling device 600 (FIG. 6) such as, as one or more cash drawers are inserted into the cash handling device, the currency and/or coin is weighed by a scale within the housing of the cash handling device, to determine the amount of cash in each drawer.

These scale arrangements may generally be used in configurations where the currency and/or coin remains in the cash drawer during the reconciliation process and possibly after, i.e., in anticipation of using the cash drawer during another shift, day, etc. However, additionally or alternatively, the currency and/or coin may be removed from the cash handling device in order to determine the amount of cash and/or coin within the cash drawer. In these arrangements, the currency and/or coin may be removed in order to be counted, weighed, etc. to determine the amount of currency and/or cash. Once the amount is determined, the currency and/or coin may be transferred to a storage module, such as a cartridge shown in FIG. 2, or may be replaced in the cash drawer. In some arrangements, some or all of the currency and/or coin may be removed. The cash drawer may then be filled with a predetermined number of bills and coins of each denomination, similar to the arrangement discussed above. Accordingly, the cash drawer may then be ready for the next shift, workday, etc. In still other arrangements, the cash may be removed from the cash drawer and the drawer may remain empty until the start of the next shift, workday, etc. when the drawer may be inserted into the cash handling device and the predetermined number of bills and coin of each denomination will be distributed to the cash drawer, as discussed above.

In some arrangements, a single cash drawer may be inserted into the cash handling device. Additional cash drawers may then be inserted into the cash handling device sequentially until all cash drawers have been counted and/or reconciled. In other arrangements including cash handling devices having multiple slots, multiple cash drawers may be inserted into the cash handling device at once to permit multiple drawers to be counted and/or reconciled at once.

In some arrangements, the system 1300 further includes a communication interface 1311 for transmitting transaction and other financial data to other devices including another cash handling device, financial institution, and the like. The data may be sent via email, short messaging service, etc. In some arrangements, the data may be sent to a printer in order to print data, reports, and the like. Display 1313 is configured to display transaction and system information as needed. Display 1313 may be a touch-sensitive display to further facilitate information entry. In one or more arrangements, the system 1300 may further include card readers (e.g., credit card or employee ID card readers), receipt printers, automated change dispensers, programmable input devices (e.g., keyboards with keys for different products) and the like.

Cash drawer 1301 may slide in and out of cash recycler 600 along slide brackets 1315 using rollers 1317. Cash drawer 1301 may further be removable from cash recycler 600 so that an employee or other user may bring cash drawer 1301 to another device (e.g., another cash recycler, point of sale system, etc.) for use during another shift, with another employee, and the like.

Currency scale 1307, as illustrated, is positioned at the bottom of drawer 1301 and underneath compartment 1305a such that scale 1307 may sense the weight of compartment 1305a and its contents. One or both of compartments 1305 and/or currency scale 1307 may be removable from drawer 1301. Currency scale 1307 may include a data connection to a controller or processor in the cash recycler 600. Alternatively or additionally, currency scale 1307 may provide currency and coin data to a remote system (e.g., a back office management system or financial institution) through a network connection. Although a single currency scale 1307 is illustrated, multiple currency scales may be used, e.g., one for each of compartments 1305. In some arrangements, the cash may be physically removed and counted by the cash handling device to obtain a count. Expected counts can also be determined by transmission of sales information from the point of sale system to the cash handling device as described more fully in U.S. patent application Ser. No. 12/277,915, filed Nov. 25, 2008 and entitled, "Back Office Integration with Cash Handling Devices and Point of Sale Devices," which is incorporated herein by reference in its entirety.

Figure 14:
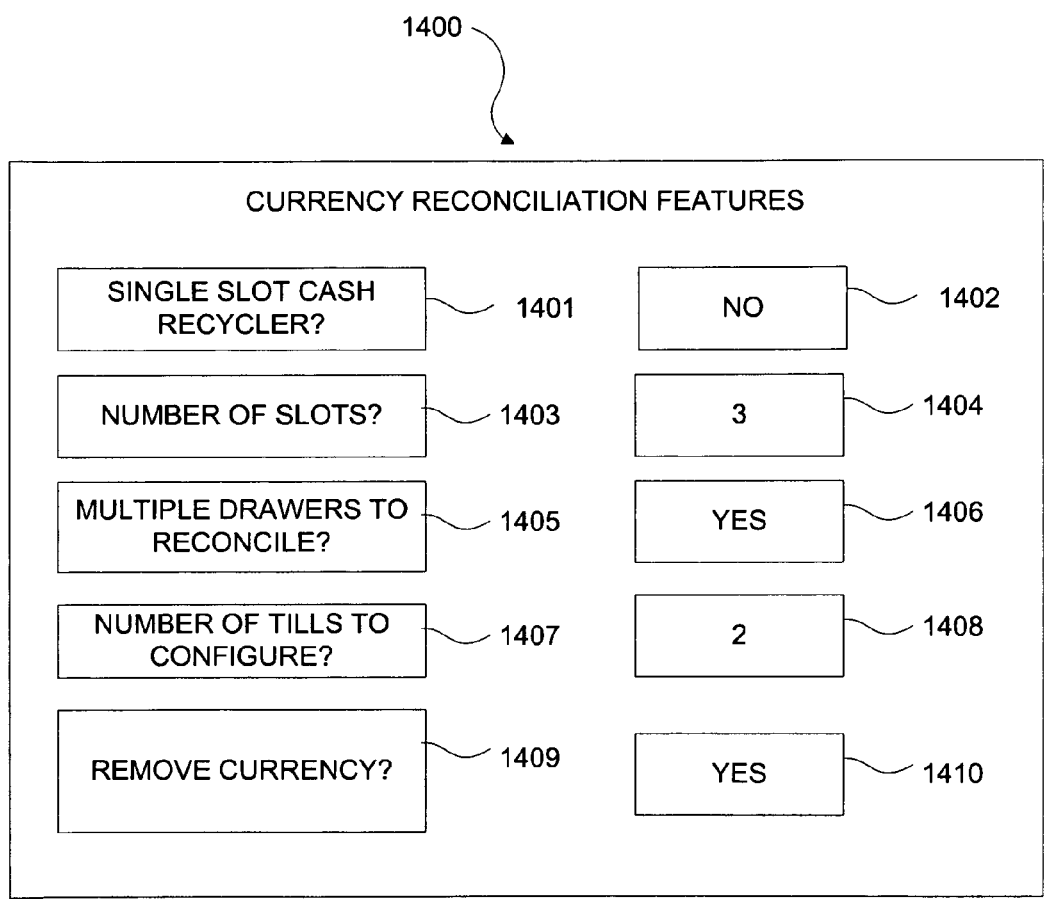
FIG. 14 illustrates an example user interface for configuring various aspects of the automatic cash counting and/or reconciling system according to aspects described herein.

FIG. 14 illustrates one example user interface that may be used with the system described herein. Similar to the user interface 900 described above with reference to FIG. 9, the user interface 1400 permits a user to configure various settings and aspects of the system, such as whether the cash handling device has a single slot 1401, the number of slots in the cash handling device 1403, whether there are multiple cash drawers to configure 1405, the number of drawers or tills to configure 1407 and whether the currency will be removed upon determining the amount of currency 1409. Each of these features may be configured in corresponding fields 1402, 1404, 1406, 1408, and 1410. Selection of the value to enter in the field may be performed using known methods of selection, such as clicking or double clicking in the field and entering the value, selecting the value from a drop-down menu, selecting a radio button associated with a desired selection, etc.

Figure 15:
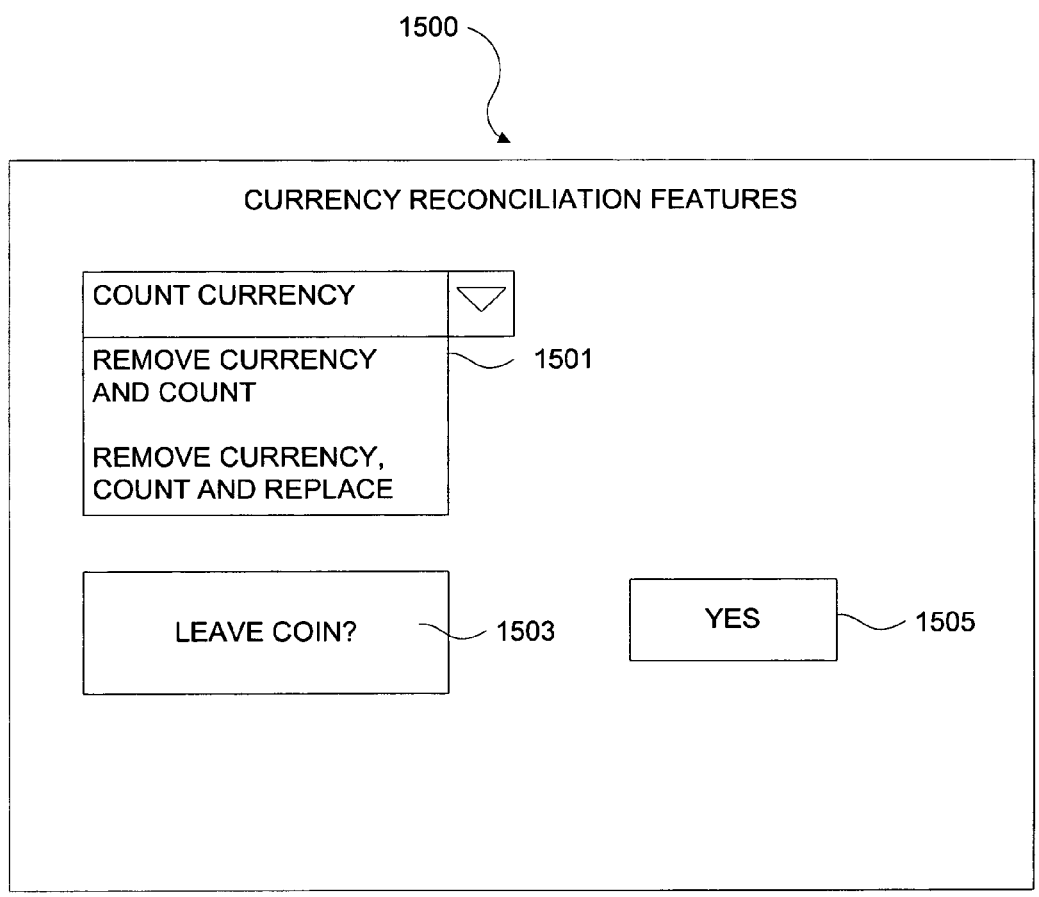
FIG. 15 illustrates another example user interface for configuring various aspects of the automatic cash counting and/or reconciling system according to aspects described herein.

FIG. 15 is another example user interface 1500 showing additional aspects and features of the system described herein. For instance, in region 1501, a user may select the reconciling process to be conducted. For instance, the user may choose to simply count the currency in the cash drawer, i.e., without removing the currency. Additionally or alternatively, the user may choose to remove the currency and count it. In still other arrangements, the user may choose to remove the currency, count and replace it. The currency may be replaced with the currency removed from the cash drawer or with another amount, such as a preconfigured amount as discussed above. Selection of this option may be done via a drop down menu, as shown in FIG. 15, or via other known methods of selection.

In region 1503 the user is provided with the option to leave the coin in the cash drawer. In field 1505, the user has selected to leave the coin. In such arrangements, the coin may be weighed in the cash drawer to determine the amount of coin and then left for another shift, workday, etc. Alternatively, the coin may be removed and counted and, in some arrangements, replaced in the cash drawer.

In some arrangements, the configurable features of FIGS. 14 and 15 may be preconfigured such that, upon insertion of a cash drawer into the cash handling device, the cash in the drawer will automatically be counted and/or reconciled according to the preconfigured aspects described. In other arrangements, insertion of a drawer may prompt a user to select the settings for that particular counting and reconciling transaction.

Figure 16:
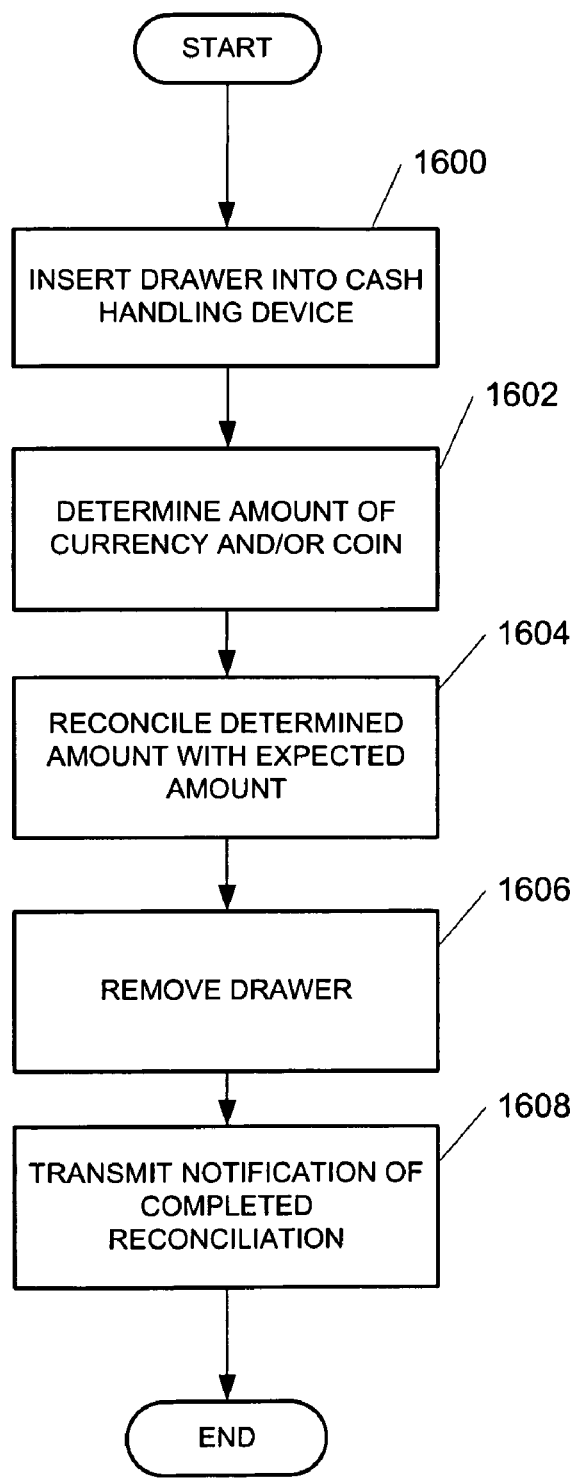
FIG. 16 is an example method of automatically counting and reconciling cash in a cash drawer according to aspects described herein.

FIG. 16 illustrates one example method of automatically determining the amount of cash in a cash drawer. In step 1600, one or more cash drawers or tills are inserted into the cash handling device. The amount of cash, such as currency and/or coin, in the drawer is determined in step 1602. Determining the amount of cash in the drawer may be done using scales, etc. as described above. In step 1604, the determined amount of cash is reconciled with an expected amount of cash in the cash drawer. In step 1606, the cash drawer is removed and, in step 1608, a notification of the completion of the counting and reconciling operation is transmitted, such as to a financial institution, another cash handling device, a back office system, a central server at a retail store at which the cash handling device is located, etc. In some arrangements, the notification may be sent prior to the cash drawer being removed from the cash handling device.

Some arrangements of the automatic cash distribution and counting system may permit a user, such as a cashier or manager at a retail store, to insert an empty drawer into the cash handling device at the beginning of a shift. The drawer may be filled with a preconfigured amount of money of various denominations, according to aspects described herein. At the end of the shift the drawer may be automatically emptied according to arrangements described herein and reconciled. In some instances, the drawer may be emptied/reconciled then refilled with a preconfigured mix of currency in preparation for use in the retail store. The drawer may then be sent back to a point of sale system in the store. The emptying/reconciling/refilling may be done automatically upon insertion of the drawer and, in some arrangements, without user input beyond inserting the drawer. This arrangement provides for quick reconciling of drawers in order to return them to use in a point of sale system more quickly than conventional reconciling systems and methods.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

Aspects of the present disclosure relate to cash handling devices. Cash handling devices generally refer to devices that are configured to accept and/or dispense currency. Cash handling devices include payment kiosks, point of sale systems such as cash registers, automated teller machines (ATMs), currency recyclers and the like. Currency recyclers generally refer to cash handling devices that are configured to dispense the same currency that was earlier deposited. For example, if a user deposits a 5 dollar bill into a cash recycler machine, the same 5 dollar bill may be dispensed during a subsequent withdrawal transaction. Thus, using currency recyclers, deposited currency may be placed immediately back into use and circulation instead of being held or frozen until a bank is able to collect and reconcile the funds, stored indefinitely and/or taken out of circulation entirely as is the case with other current cash handling devices.

We claim:

1. A cash handling device, comprising:
   a currency storage portion;
   a housing having at least one aperture for receiving a cash drawer with cash therein, the cash including paper currency;
   a sensor, located within the housing, the sensor determining that the cash drawer is inserted into the at least one aperture and is received in the housing; and
   a cash removing and counting mechanism operable, in response to said determining, to automatically cause the cash handling device to count an amount of cash in the cash drawer, wherein the cash removing and counting mechanism includes a scale within the cash drawer weighing the paper currency, and wherein the counting is performed at least in part by the weighing, and wherein the cash removing and counting mechanism is configured to remove cash from the cash drawer and at least one of: replace the removed cash in the cash drawer, replace a first portion of the cash in the cash drawer and transfer a second portion of the cash to the cash storage portion, and transfer the cash to the cash storage portion.

2. The cash handling device of claim 1, wherein the cash in the cash drawer further includes coin.

3. The cash handling device of claim 2, wherein the cash counting mechanism includes a scale for weighing coin.

4. The cash handling device of claim 3, wherein the scale for weighing coin is located within the housing of the cash handling device.

5. A cash handling device comprising:
   a currency storage portion;
   a housing having at least one aperture for receiving a cash drawer with cash therein, the cash including coin;
   a sensor, located within the housing, the sensor determining that the cash drawer is inserted into the at least one aperture and is received in the housing; and
   a cash removing and counting mechanism operable, in response to said determining, to automatically cause the device to count an amount of cash in the cash drawer, wherein the cash removing and counting mechanism includes a scale within the cash drawer weighing the coins, wherein the counting is performed at least in part by the weighing, and wherein the cash removing and counting mechanism is configured to remove the cash from the cash drawer and at least one of: replace the removed cash in the cash drawer, replace a first portion of the cash in the cash drawer and transfer a second portion of the cash to the cash storage portion, and transfer the cash to the cash storage portion.

6. The cash handling device of claim 1, further including a cash dispensing mechanism for dispensing a predetermined amount of paper currency to the cash drawer after an amount of cash in the cash drawer has been determined.

7. The cash handling device of claim 6, wherein the predetermined amount of paper currency is based on user input.

8. A method for reconciling cash in a cash drawer of a cash handling device having a processor, the cash including at least one of: coin and paper currency, comprising:
   inserting the cash drawer into an aperture in the cash handling device having a housing including at least one aperture and a currency storage portion;
   determining, by the processor, that the cash drawer is inserted into the at least one aperture;
   responsive to determining that the cash drawer is inserted into the at least one aperture, automatically determining, by the processor, an amount of cash in the cash drawer, wherein said determining is done at least in part by a scale within the cash drawer; and
   electronically transmitting the determined amount of cash in the cash drawer to a responsible entity, and automatically removing the cash in the cash drawer and at least one of:
   transferring it to the currency storage portion, replacing the cash in the cash drawer, and transferring a first portion of the cash to the cash storage portion and replacing a second portion of the cash in the cash drawer.

9. The method of claim 8, wherein the responsible entity is at least one of a retail store manager, a financial institution and a central server at the retail store.

10. The method of claim 8, further including distributing a predetermined amount of paper currency to the cash drawer after the step of removing paper cash from the cash drawer and determining the amount of cash in the cash drawer.

11. The method of claim 8, wherein the step of determining the amount of cash in the cash drawer includes weighing coin in the cash drawer.

12. A method for reconciling cash in a cash drawer of a cash recycling unit having a processor, the cash including at least one of: coin and paper currency, comprising:
    inserting the cash drawer into an aperture in the cash recycling unit having a housing including at least one aperture and a currency storage portion;
    determining, by the processor, that the cash drawer is inserted into the at least one aperture;
    responsive to determining that the cash drawer is inserted into the at least one aperture automatically determining, by the processor, an amount of paper currency in the cash drawer, wherein said determining is done at least in part by a scale within the cash drawer; and
    electronically transmitting the determined amount of paper currency in the cash drawer to a responsible entity, and automatically removing the paper currency in the cash drawer and at least one of: transferring it to the currency storage portion, replacing the cash in the cash drawer, and transferring a first portion of the cash to the cash storage portion and replacing a second portion of the cash in the cash drawer.

* * * * *